United States Patent [19] [11] 4,074,771
Morrison [45] Feb. 21, 1978

[54] ROCK DRILL

[75] Inventor: Ward D. Morrison, South Acworth, N.H.

[73] Assignee: Joy Manufacturing Company, Pittsburgh, Pa.

[21] Appl. No.: 670,262

[22] Filed: Mar. 25, 1976

[51] Int. Cl.$^2$ ............ B23Q 5/00
[52] U.S. Cl. ............ 173/6; 173/11
[58] Field of Search ............ 173/1, 5, 6, 7, 8, 9, 173/10, 11

[56] References Cited

U.S. PATENT DOCUMENTS

| | | | |
|---|---|---|---|
| 3,561,542 | 2/1971 | Hanson | 173/1 |
| 3,581,830 | 6/1971 | Stoner | 173/6 |
| 3,823,784 | 7/1974 | Feucht | 173/1 |
| 3,971,449 | 7/1976 | Nylund et al. | 173/11 |

*Primary Examiner*—Robert A. Hafer
*Attorney, Agent, or Firm*—J. Stewart Brams

[57] ABSTRACT

A rock drill assembly and more particularly a rock drill assembly having improved fluid power means therefor.

19 Claims, 2 Drawing Figures

ROCK DRILL

Figures 1, 2:
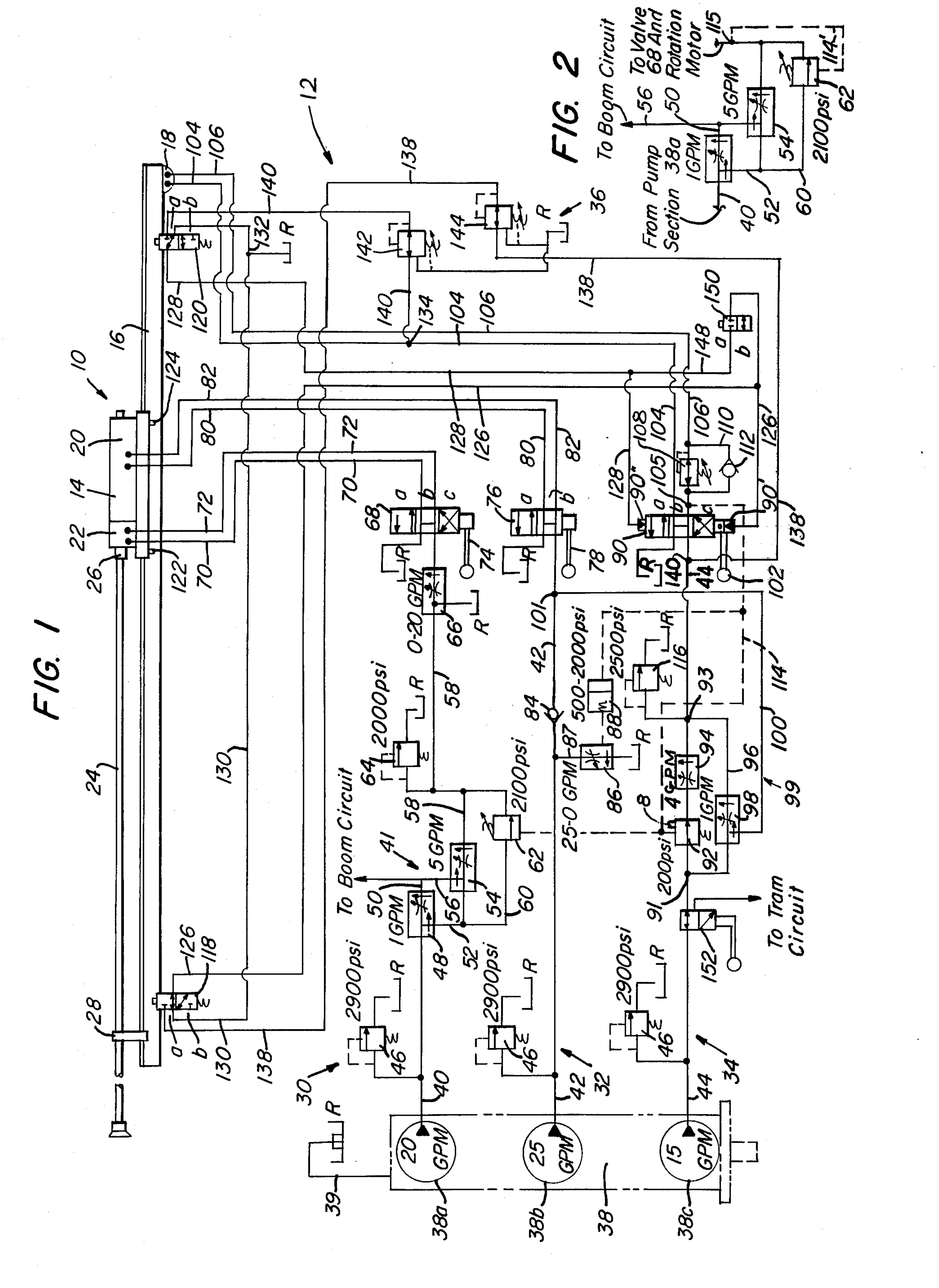

In the art of rock drilling it is well known to employ a drill assembly comprising a percussive rock drill feedably carried upon an elongated feed frame which is in turn adjustably carried by a mobile, articulated support means such as a crawler base and boom apparatus. Such drilling assemblies have commonly included fluid power means to provide motive power for at least some of the drill functions such as operation of the drill percussion motor, rotation motor and feed motor, among others. In addition, the adjustability and mobility of the drill supports have often been powered by fluid means.

Although the fluid power means of such drill assemblies typically have been operable by manual controls, it is known in the art to provide fluid circuits with means to automatically control the drill operating cycle to thereby relieve the operator of much tedious control valve manipulation and to secure uniform, consistent drill operation. For example, U.S. Pat. Nos. 3,381,761 and 3,823,784 illustrate such automatic fluid control means.

Although prior rock drills embodying automatically controlled fluid power means have generally served the purposes intended, they have nevertheless often been subject to serious deficiencies. For example, in prior drills the control of motive fluid flow in the drill percussion circuit generally has not been adapted to respond to feed circuit pressure. Accordingly, such drills have been subject to serious damage in some cases by continued high power percussion in the absence of a substantial bit load, as for example when the drill bit traverses a void in the rock during drilling. Additionally, many prior automatic fluid control systems for rock drills have not, in spite of their various automatic control capabilities, sufficiently simplified the operator's control task, or have done so at the expense of operating precision, uniformity, safety or economy. Also, many prior automatic fluid control systems have been interposed downstream from the main control valves of the drilling apparatus and such systems thus have not been readily adaptable to state of the art drilling rigs including factory assembled fluid lines and controls.

These and other deficiencies of prior fluid control systems are overcome by the present invention which includes within its scope but is not limited to means to control drill functions in direct response to the resistance to drill feeding and/or rotation as indicated by the pressure in the feed and rotation circuits. The present invention additionally provides a simplified fluid control system permitting greatly simplified operation of the drill assembly whereby the operator is relieved of much manual valve manipulation and is free for other productive effort such as tending a multiplicity of simultaneously operable, automatic drill assemblies.

These and other objects and advantages of the instant invention are more fully detailed in the following description with reference to the included figures, in which:

FIG. 1 is a schematic representation of a fluid power means embodying the principles of this invention; and FIG. 2 is a fragmentary portion of FIG. 1 illustrating one alternative configuration of the fluid power means of FIG. 1.

There is generally indicated at 10 in FIG. 1 a simplified rock drilling assembly powered by fluid power means 12 embodying the principles of the present invention and shown schematically for purposes of simplification and clarity. The drill assembly 10 is shown as comprising a drill 14 carried by an elongated guide or feed frame 16 and selectively movable axially therealong by any suitable feed means, for example a well known chain or screw feed (not shown) powered by means shown as a fluid motor 18 which is carried adjacent the rearward end of frame 16. As shown, the drill 14 includes well known cooperable percussion and rotation motors 20 and 22, respectively, whereby, coincident with forward feeding of the drill 14 one or more of a plurality of drilling modes may be imparted to an elongated drill steel and bit assembly 24 affixed to a forward chuck portion 26 of the drill 14 and extending forwardly therefrom axially along frame 16 through a forward guide or centralizer 28 for drilling rock formations. Of course the frame 16 ordinarily will be supported by any suitable known means (not shown) such as a mobile crawler frame having an articulated, elongated boom adjustably carried thereon for support of the feed frame 16.

Inasmuch as such drill assemblies as hereinabove described are well known in the art, further detailed description thereof is omitted herefrom. Suffice it to note in this regard that the fluid power means of this invention may be utilized to power any of various well known rock drills, and the reader should therefore understand from the outset that the illustrative drill assembly 10 is not to be construed as a limitation on the invention herein described.

As shown, the fluid power means 12 of this invention comprises a hydraulic circuit means having four circuit portions: a rotation circuit portion 30 for powering the rotation motor 22; a percussion or hammer circuit portion 32 for powering the percussion motor 20; a feed circuit portion 34 for powering feed motor 18 to move drill 14 longitudinally of the frame 16; and a feed control circuit portion 36 for controlling the operation of feed circuit portion 34.

Each of circuit portions 30, 32 and 34 communicates with a fluid flow source shown as a three-stage, uniform flow hydraulic pump 38 having respective stages 38*a*, 38*b* and 38*c* suitably adapted for delivery of pressure fluid at a desired flowrate to the respective circuit portions 30, 32 and 34 via respective fluid conduits 40, 42 and 44. An independent relief valve means 46 of any suitable type communicates with each conduit 40, 42 and 44 downstream of pump 38 for automatically limiting the respective conduit pressures to a desired maximum by directing a flow of fluid to a common reservoir R upon occurrence of an overpressure condition.

In the circuit portion 30, conduit 40 communicates intermediate the pump section 38*a* and a sequencing circuit portion 41 comprised of a first flow regulator valve 48 which divides the flow received from conduit 40 between a first outlet conduit 50 and a second outlet conduit 52 which communicates with a second flow regulator valve 54. Valve 54 divides the flow received from conduit 52 between a first outlet conduit 56 which communicates with conduit 50, and a second outlet conduit 58. A bypass conduit 60 communicates intermediate conduits 52 and 58 to bypass valve 54 and includes therein a sequence valve 62 which as shown is maintained in the normally closed position by spring bias means and is opened by any suitable actuator in response to a pressure signal as described hereinbelow. The fluid flow within conduit 50 may be utilized for any suitable purpose such as the operation of known fluid circuit means (not shown) to control an articulated drill supporting boom (also not shown), or the like.

The conduit 58 includes: a relief valve means 64 similar in all respects to the valves 46 for limiting the pressure in conduit 58 to a desired maximum; an adjustable flow regulator valve 66 which permits free flow of fluid therethrough up to a desired maximum flowrate and dumps all excess flow over such maximum to the common reservoir R; and a four way, open center control valve 68 for manual control of fluid flow to the drill rotation motor 22 via conduit means 70 and 72 communicating therebetween. The valve 68 is manually operable, by a handle 74 for example, to positions *a, b* and *c* as shown for normal rotation, neutral (i.e. no rotation), and reverse rotation, respectively, of motor 22.

In percussion circuit portion 32, conduit 42 communicates with a control valve means 76 which in turn communicates with percussion motor 20 via a pair of conduits 80 and 82. The valve 76 is shown as being manually operable as by a handle 78 into positions *a* and *b* for percussion motor operation, and neutral (i.e., no percussion) respectively. Upstream of valve 76 in conduit 42 is a check valve 84 which permits flow only in a downstream direction for purposes to be explained hereinbelow, and directly upstream of check valve 84 a flow regulator valve 86 is connected to conduit 42 via a conduit 87. Valve 86 has an adjustable, continuously variable orifice for dumping any fractional part, or all of the total flow within conduit 42 to the common reservoir R. The flowrate through valve 86 to the reservoir R is controlled by a mechanical actuator 88 in response to a pressure signal as described hereinbelow.

In feed circuit portion 34 the conduit 44 communicates through a feed flow regulating circuit portion 99 with a feed flow control valve 90. Circuit portion 99 comprises a pressure actuated sequencing valve 92 located in conduit 44 directly upstream of a flow regulator valve 94. A bypass conduit 96 communicates between the upstream side of valve 92 and the downstream side of valve 94 as by respective connections 91, 93 to conduit 44 and includes an adjustable flow regulating valve 98 which passes a portion of the fluid flow through conduit 96 and back into conduit 44 at connection 93 when valve 92 is closed by pressure actuation as hereinabove mentioned. The excess flow not passed on to connection 93 by valve 98 may be disposed of in any suitable way such as being simply returned to the reservoir. However, in FIG. 1 such excess flow is shown as being diverted for supplemental impact flow by passing via a conduit 100 into the previously described hammer circuit portion 32, intermediate the valves 84 and 76 as at 101.

The flow of supplemental fluid into impact circuit portion 32 as described provides the additional advantage of two distinct levels of impact flow through multiple impact fluid inputs. Of course it is to be understood that this feature may be provided in numerous ways other than the supplying of supplemental fluid from the feed circuit, for example by a second selectively operable impact circuit flow source. Thus the inclusion of conduit 100 connecting the feed circuit portion 34 with impact circuit portion 32 is an ancillary aspect of the invention disclosed herein. Additionally, it is to be understood that the conduit 100 could as well be used to divert a portion of the feed circuit flow into the rotation circuit portion 30.

The circuit portion 34 further comprises a pressure relief valve means 116 communicating with conduit 44 at connection 93 to limit the pressure thereat to a desired maximum.

As shown the valve 90 is a four-way, open center valve having a manual actuator 102 for operation of the valve to respective positions *a, b* and *c* for control of the feed motor 18 via a pair of conduits 104 and 106 in forward feed, neutral (i.e. no feeding) and reverse feed modes, respectively.

Conduit 106 includes a pressure reducer valve 108 to limit the pressure to motor 18 via conduit 106 to a desired maximum. The valve 108 is operable only during forward feed operation during which valve 90 is in position *a* and conduit 106 is the fluid input to motor 18. In the reverse feed mode (position *c* of valve 90) conduit 106 functions as an exhaust or outlet from motor 18 and in this mode the flow from motor 18 via conduit 106 bypasses valve 108 by means of a bypass conduit 110 communicating with conduit 106 on opposed sides of valve 108. The bypass 110 includes a one way check valve 112 to preclude any fluid flow bypassing valve 108 during forward feeding. Accordingly, there is provided a controlled feed force for forward feeding, and a bypass of such feed force control during reverse feeding or retracting.

The feed circuit portion 34 still further includes pilot pressure conduit means 114 communicating with conduit 106 intermediate valve 90 and the conduit 110 as at 105, which conduit 114 communicates with pressure responsive actuators in valves 92 and 62, and with actuator 88 as shown in dashed lines whereby these valves are adapted to control fluid flow in their respective circuit portions in response to feed circuit pressure in a manner to be detailed hereinbelow.

The feed control circuit portion 36 comprises a pair of sensor valves 118, 120 carried adjacent respective forward and rearward portions of feed frame 16 for actuation by respective actuator portions 122, 124 of drill 14 as the drill is fed longitudinally of frame 16. Each of valves 118, 120 communicates via a respective conduit 126, 128 with a respective pressure fluid operated actuator portion 90', 90" of valve 90. The valves 118, 120 additionally communicate with the common reservoir R by respective conduits 130, 132, and with a source of pressure fluid flow via respective conduits 138, 140. The pressure fluid source associated with conduit 138 is shown as a connection at 140 to conduit 44 directly upstream of valve 90. The fluid flow source associated with conduit 140 is shown as a connection to conduit 104 as at 134 intermediate the valve 90 and feed motor 18.

It will be appreciated by the reader in view of the previous description of the feed circuit 34 that the presence or absence of fluid pressure in the conduits 138, 140 depends upon the position of valve 90, as will be described in detail hereinbelow. As shown each of the conduits 138, 140 may include a pressure regulator valve 142, 144 which may be of any type suitable to limit the fluid pressure in conduits 138, 140 to a desired maximum.

The feed control circuit portion 36 further includes a cross-connect conduit 148 communicating between the conduits 126, 128 and including a valve 150 having a closed position *a* whereat the control circuit portion 36 operates normally, and an open position *b* whereat the operation of the feed control circuit 36 is negated by equalization of any fluid pressure applied to the actuators 90', 90" via the conduit 148.

The operation of the circuit means 12 is described hereinbelow with reference to the particular valve flow and pressure parameters indicated in FIG. 1. Of course it is to be understood that these particular parameters are merely illustrative of one preferred operating mode for the circuit 12, and that in general the flow and pressure set points as well as other parameters of the system may be selected from a wide range of values according to the particular design considerations to be satisfied. Accordingly, the indicated parameters are not to be construed as limitations on the invention herein.

Prior to any drilling operation the pump 38 will be operating at full output by any suitable motive means (not shown) such as an electric motor or the like to deliver 20, 25 and 15 gallons per minute (gpm) into respective conduits 40, 42 and 44 from the respective pump stages 38*a*, *b* and *c*. The control valves 68, 76 and 90 are all in the neutral position *b* such that any fluid flow reaching the respective control valve is circulated therethrough and back to reservoir R. Furthermore, in each valve 68, 76 and 90 the fluid inlet and exhaust as well as the respective pairs of conduits 70–72, 80–82 and 104–106 all communicate with each other whereby the fluid pressures in all such interconnected conduits are equalized to produce the neutral operating mode of respective motors 22, 20 and 18.

In conduit 40 a 20 gpm flow is directed to valve 48 wherein such flow is divided between a 1 gpm flow to conduit 50 and a 19 gpm flow to conduit 52. Inasmuch as valve 62 in bypass conduit 60 is closed, the 19 gpm flow in conduit 52 is directed into valve 54 wherein such flow is divided between a 5 gpm flow to conduit 58 and the remainder, or 14 gpm to conduit 56. The flow of 14 gpm in conduit 56 combines with the 1 gpm flow in conduit 50 to provide a 15 gpm flow for any desired function, for example to supply a boom circuit as indicated.

The 5 gpm flow from valve 54 is directed via conduit 58 into valve 66 which may be adjusted to pass any selected maximum flow between 0 and 20 gpm to valve 68 according to the maximum rotation speed desired. If valve 66 were set at 10 gpm for example, the valve would pass any flow up to a 10 gpm maximum and would dump any excess flow over 10 gpm to the reservoir R. For purposes of illustration valve 66 will be presumed to be set for a maximum 20 gpm flow therethrough whereby any flow up to 20 gpm will pass through valve 66 into valve 68 without restriction. Accordingly, the 5 gpm flow in conduit 58 passes through valve 66 into valve 68 and thence to the reservoir R. Small portions of the 5 gpm flow may also circulate through the conduit 70, 72 and motor 22 thereby providing a desirable cleansing and lubricating action.

In circuit portion 32 the full 25 gpm flow from pump stage 38*b* is directed via conduit 42 and valve 86 back to the reservoir R such that the only flow into valve 76 is a 10 gpm flow directed from feed circuit portion 34 via conduit 100, connection 101 and conduit 42 in a manner to be described hereinbelow. The check valve 84 assures that none of this 10 gpm flow will backflow via valve 86 into the reservoir R. Thus the 10 gpm flow circulates freely through valve 76 which is in neutral position *b*, and thence back to reservoir R with a portion of the flow circulating within conduit 80, 82 and in percussion motor 20 in the manner described hereinabove for the rotation motor 22.

In circuit portion 34 a 15 gpm flow from pump stage 38*c* is directed via conduit 44 through a manually operable control valve 152 which may be used to direct fluid flow, when not needed in the feed circuit 34, for other purposes such as operation of a tram control circuit for example. With valve 152 in the position shown the 15 gpm flow continues through conduit 44 and valve 92, and then into valve 94, which permits 4 gpm of the 15 gpm flow to pass. The remaining 11 gpm of the flow is directed via bypass conduit 96 into valve 98 wherein it is divided between a 1 gpm flow which continues through conduit 96 to join the 4 gpm output of valve 94 at connection 93, and a 10 gpm flow which is directed via conduit 100 into conduit 42 at connection 101 as hereinabove described.

The combined 4 and 1 gpm flows from respective valves 94, 98 continue in conduit 44 into control valve 90 and thence to reservoir R with a portion of such flow circulating within conduits 104, 106 and motor 18 as hereinabove described for motors 20 and 22.

Prior to the start of drilling the drill 14 is at rest in its rearwardmost position upon frame 16 such that actuator 124 holds sensor valve 120 in the *a* position and sensor valve 118 is in the *b* position. Accordingly, pressure actuator 90″ of the valve 90 receives a pressure signal comprised of whatever residual or back pressure exists in conduit 104 via valve 142, sensor 120 and conduit 128, whereas the pressure actuator 90′ communicates with reservoir R via conduit 126, sensor 118 and conduit 130. In order to preclude initiation of forward feed by a false signal in actuator 90″ or by any other cause, the handle 102 of valve 90 is equipped with any suitable mechanical lock (not shown) whereby the valve 90 cannot be pressure actuated to the *a* position (forward feed) but must instead be manually actuated into the forward feed mode by handle 102.

To begin a drilling cycle the valves 68 and 76 are manually actuated to the *a* position (valve 68 may alternatively be placed in the *c* position if reverse rotation is desired). Accordingly, the 5 gpm flow in the rotation circuit portion 40 is circulated to reservoir R via conduit 58, valve 68, conduit 72, motor 22, conduit 70, and back through valve 68 to produce a low speed or idling rotation of the drill steel 24, and the 10 gpm flow entering the percussion circuit portion 32 at 101 is directed to reservoir R via conduit 42, valve 76, conduit 82, motor 20, conduit 80 and back through valve 76 to produce a low power or idling mode of percussion. Finally, the valve 90 is operated by handle 102 into the *a* position to direct the 5 gpm flow in conduit 44 (downstream of valves 94, 98) to reservoir R via the valve 90, conduit 106, motor 18, conduit 104, and back through valve 90 thereby producing a low speed forward feeding of the drill 14. The maximum feed force in this mode is limited by the pressure reducer valve 108 as described hereinabove.

Immediately, upon initial forward movement of the drill 14, the actuator 124 disengages sensor 120 whereby a spring bias returns sensor 120 to the *b* position so that the actuator port 90″ communicates with reservoir R via conduit 128, valve 120 and conduit 132 as shown. Additionally, upon initial forward feeding and before the drill bit contacts the rock face to be drilled, a minimal feed resistance in the form of frictional forces and the like causes the pressure in the feed supply conduit 106 downstream of valve 90 to increase to several hundred pounds/square inch whereby the valve 92 is caused to close by a pressure signal directed thereto from conduit 106 via connection 105 and pilot conduit 114.

Upon the shifting of valve 92 all of the 15 gpm flow from pump section 38*c* is directed into valve 98 where it is split between a minimal 1 gpm feed flow that is directed via conduits 96 and 44, and valve 90 to feed motor 18, and a 14 gpm percussion flow that is directed via conduits 100 and 42 and valve 76 to percussion motor 20. Accordingly, the feed flow is reduced from 5 gpm to 1 gpm to reduce the feed rate, and the percussion flow is increased from 10 gpm to 14 gpm for an increased percussor idling speed.

As forward feeding continues the drill bit ultimately comes into contact with the rock formation whereon the solid resistance to further feeding will rapidly increase the feed circuit pressure. At this point the bore hole is collared by the operator's manipulation of valve 90 between the *a* and *b* positions to apply just sufficient feed pressure to the drill bit for efficient collaring. As the feed pressure reaches and surpasses 500 psi a pressure signal to actuator 88 via pilot 114 causes the outlet orifice of valve 86 to begin closing such that progressively less and less of the 25 gpm flow in conduit 42 is returned to reservoir R and proportionately more is directed via conduit 42 and valve 76 for progressively higher power percussion. This combination of varying feed pressure and simultaneously varying percussion power by manipulation of valve 90 provides a most convenient means of controlling the bore hole. Additionally, it will be noted that if in collaring the hole the feed resistance drops, as for example if the rock surface shatters or the bit slips off the rock face, the percussion power immediately drops to idle in response to the reduced feed circuit pressure.

When the hole has been collared the operator merely moves valve 90 fully to the *a* position and as the drill bit is biased into forceful contact with the rock face, the feed circuit pressure rapidly increases to full operating pressure which is in the range of approximately 2400 to 2800 psi, for example. In response, the orifice of valve 86 closes progressively to a completely closed state at 2000 psi feed pressure to supply the full 25 gpm percussion flow from pump section 38*b* to motor 20 in addition to the 14 gpm already being supplied via conduit 100. Finally, at 2100 psi feed pressure the valve 62 opens so that the 19 gpm flow in conduit 52 bypasses valve 54 thereby decreasing boom circuit flow to 1 gpm and increasing rotation flow from 5 gpm to 19 gpm for high speed rotation of the bit. Of course the system operating pressures are at all times limited by the relief valves 46, 64 and 116 as indicated to preclude damage to circuit components.

Drilling will continue automatically at full power percussion, full speed rotation and low feed rate as described hereinabove, with automatic rotation and percussion reductions in response to any feed pressure fall off until the actuator 120 engages sensor 118 to move it to the *a* position whereupon a pressure actuating signal will be directed to actuator 90' of valve 90 from conduit 44 via connection 140, conduit 138, pressure regulator 144, sensor 118, and conduit 126 to shift valve 90 to the *c* position for reverse feed operation. It will be noted that in the reverse feed mode the conduit 104 is the pressure fluid inlet to motor 18 and the conduit 106 functions as the exhaust. All fluid exhausted from motor 18 to reservoir R flows via bypass conduit 110 and check valve 112. Accordingly, a greatly reduced pressure is provided to pilot conduit 114 whereby valve 92 returns to its normally open position to provide a 5 gpm flow once again for the higher reverse feed rate and the consequent quick withdrawal from the bore hole. As has been noted, immediately upon shifting to the reverse feed mode, feed resistance (and therefore the feed circuit pressure) drops off sharply as the drill bit disengages the rock face. The pressure response actuators of valve 88 and 62 respond accordingly to return both the rotation and percussion motors 22 and 20 to the idle mode of operation. High speed reverse feed or retraction with idle percussion and rotation continues until the actuator 124 on drill 14 once again shifts sensor 120 to the *a* position whereupon a pressure signal is directed from conduit 104 to actuator 90'' via connection 134, conduit 140, pressure regulator 142, sensor 120 and conduit 128 to shift valve 90 to the *b* (neutral) position. The reader will recall the hereinabove mentioned mechanical stop on handle 102 which precludes the valve 90 being shifted from reverse feed into the forward feed mode by the actuator 90''. Accordingly, the feed motor 18 stops with drill 14 at its rearwardmost position and with rotation and percussion motors 22, 20 idling, ready for the initiation of another drilling cycle by the operator's manipulation of valve 90 as hereinabove described.

It is to be noted that if the operator prefers manual control of the drilling apparatus he may shift valve 150 to the *b* position to override the automatic feed control functions described hereinabove, and may manually control percussion and rotation by manipulation of valve 68 and 76. He may not, however, according to this embodiment of the invention, override the automatic pressure responsive control of the rotation and percussion fluid flow rates. It is to be noted however that such means to override the automatic pressure responsive control of rotation and percussion fluid flow rates could be provided as for example by manual actuators for the pressure actuated valves such as actuator 8 on valve 92, and similar actuators on valves 62 and 86, for example. Such a refinement is considered to be fully within the scope of the invention.

According to an alternative embodiment of the instant invention as depicted in FIG. 2 the shifting of valve 62 to provide a dual speed rotation capability may be controlled by a pilot 114' which senses the pressure in the rotation circuit itself as at 115. This is considered to be a viable alternative inasmuch as the rotation circuit pressure will rise with resistance to rotation, which is in turn related to feed pressure since increasing pressure between the rock face and the bit will produce increased resistance to rotation therebetween.

According to the description hereinabove there is provided by the instant invention an improved circuit means for operation of a percussive tool such as a rock drilling apparatus wherein the improved fluid circuit comprises circuit portions having control means to control the fluid flow therein for automatically controlled rotation speed and percussion power levels in response to feed circuit and/or rotation resistance. Furthermore, the invention herein provides for combining the flow from at least one of such independent circuit portions with a part of the feed circuit flow for reduced feed rate and simultaneously increased rotation or percussion flow. Accordingly, the present invention provides simplified hole collaring and drill operation by manipulation of a single control valve among other operating advantages.

It is to be noted that although the drill percussion and rotation power means are fluid power means, the feed drive is shown as a fluid drive means only for purposes of illustration. In practice the feed drive may be any suitable alternative, for example an electrical drive with means responsive to feed thrust or biasing to generate an electrical signal for controlling the valves 62 and 86.

Notwithstanding the reference hereinabove to a particular preferred embodiment of the invention it is of course to be understood that this invention may be practiced in numerous alternative embodiments with various modifications thereto without departing from the broad spirit and scope thereof. For example: the rotation speed and percussion power levels may be variable in a single step fashion, in a plurality of steps, or in a continuous fashion; the circuit means might be arranged to provide excess flow from the feed circuit to both the percussion and rotation circuits upon the increase of feed resistance; valve 152 may combine the flows in conduits 42 and 44 for use in tramming circuit or in other functions; pilot 114 may be connected to conduit 44 upstream of valve 90, as at 140 to provide varying rotation, feed and percussion as described in response to feed pressure variation during both forward feed and retract cycles whereby higher percussion and rotation would be automatically initiated in response to resistance met during the retract cycle as well as during forward feed; sensor valve 118, 120 may take alternative forms; and the like.

Inasmuch as these and other embodiments and modifications have been envisioned and anticipated by the inventor, it is respectfully submitted that the invention should be interpreted broadly and limited only by the scope of the claims appended hereto.

What is claimed is:

1. In a drilling apparatus adapted to drill earth formations and including a powered drill means and powered means for moving such drill means into biased engagement with such an earth formation; the improvement comprising: first motive means for simultaneously actuating such drill means and such means for moving; second motive means for selectively actuating such drill means to supplement said first mentioned actuating of such drill means; and control means cooperable with said second motive means to control said selective actuating in response to selected magnitudes of such biasing.

2. A drilling apparatus as claimed in claim 1 wherein such drill means and such means for moving are fluid powered and said first and second motive means are respective first and second fluid power means.

3. A drilling apparatus as claimed in claim 2 wherein said control means is operable in response to the pressure of motive fluid being supplied to actuate such means for moving.

4. A drilling apparatus as claimed in claim 3 wherein said control means communicates by fluid pressure pilot means with the portion of said first fluid power means which supplies motive fluid to such means for moving.

5. A drilling apparatus as claimed in claim 2 wherein said first fluid power means includes first fluid circuit means for supplying motive fluid to such drill means and such means for moving.

6. A drilling apparatus as claimed in claim 5 wherein said first fluid circuit means includes fluid flow divider means operable to divide a portion of the fluid flow in said first fluid circuit means between the respective portions thereof which direct motive fluid to such drill means and such means for moving.

7. A drilling apparatus as claimed in claim 6 wherein said fluid flow divider means is operable in response to the pressure of motive fluid being supplied to actuate such means for moving.

8. A drilling apparatus as claimed in claim 5 wherein said second motive means includes second fluid circuit means for supplying motive fluid to actuate such drill means and said control means is cooperable with said second fluid circuit means to control the flow of motive fluid therein.

9. A drilling apparatus as claimed in claim 8 wherein said second fluid circuit means includes a plurality of circuit portions for actuating such drill means in a respective plurality of drilling modes and said control means is operable to control fluid flow in at least selected ones of said plurality of said circuit portions.

10. A drilling apparatus as claimed in claim 9 wherein said control means is operable in response to the pressure of motive fluid being supplied to actuate such means for moving.

11. A drilling apparatus as claimed in claim 10 wherein said control means includes flow control valve means in said at least selected ones of said plurality of circuit portions.

12. A drilling apparatus as claimed in claim 11 wherein said flow control valve means are in fluid communication with said first fluid circuit means by fluid pressure pilot means.

13. A drilling apparatus as claimed in claim 9 wherein such plurality of drilling modes includes at least a rotary drilling mode and a percussive drilling modes and the ones of said plurality of circuit portions for actuating such drill means in such rotary and percussive modes are among the said at least selected ones of said plurality of circuit portions.

14. A drilling apparatus as claimed in claim 13 wherein said control means is operable to provide a stepped variation of such rotary mode.

15. A drilling apparatus as claimed in claim 13 wherein said control means is operable to provide a continuous variation of such percussive mode.

16. A drilling apparatus as claimed in claim 12 wherein said fluid is a hydraulic fluid.

17. A drilling apparatus as claimed in claim 5 wherein such means for moving includes an elongated feed frame adapted to have such drill means movably mounted thereon and fluid powered feed means cooperable with such feed frame to move such drill means longitudinally thereof, and said first fluid circuit means includes directional control valve means operable to influence such magnitude of biasing by controlling the direction of movement of such drill means along such feed frame.

18. A drilling apparatus as claimed in claim 17 additionally including sensor means carried by such feed frame and cooperable with said directional control valve means to actuate said directional control valve means in response to sensing of the position of such drill means on such feed frame.

19. In a drilling apparatus adapted to drill earth formations and including a drill means and means for moving such drill means into biased engagement with such earth formation, the method of actuating such drilling apparatus comprising the steps of: actuating a first motive means to energize such drill means and such means for moving for simultaneous operation thereof at respective first power levels; actuating a second motive means to supplementally energize such drill means for operation thereof at a second power level greater than said first power level of such drill means; and controlling said supplemental energizing in response to selected magnitudes of such biasing.

* * * * *

UNITED STATES PATENT OFFICE
CERTIFICATE OF CORRECTION

PATENT NO. : 4,074,771

DATED : February 21, 1978

INVENTOR(S) : Ward D. Morrison

It is certified that error appears in the above-identified patent and that said Letters Patent are hereby corrected as shown below:

In Column 7, line 27, delete "controlling" and insert --collaring--.

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*